(12) United States Patent
Frost et al.

(10) Patent No.: US 8,167,729 B2
(45) Date of Patent: May 1, 2012

(54) SEALING ELEMENT AND SEALING ASSEMBLY FOR HOMOKINETIC JOINTS

(75) Inventors: Sebastian Frost, Bindfelde (DE); Gerald Langer, Buelstringen (DE)

(73) Assignee: IFA-Technologies GmbH, Haldensleben (DE)

( * ) Notice: Subject to any disclaimer, the term of this patent is extended or adjusted under 35 U.S.C. 154(b) by 168 days.

(21) Appl. No.: 12/381,687

(22) Filed: Mar. 16, 2009

(65) Prior Publication Data

US 2009/0236806 A1 Sep. 24, 2009

(30) Foreign Application Priority Data

Mar. 19, 2008 (DE) .......................... 10 2008 015 006

(51) Int. Cl.
*F16D 3/227* (2006.01)
(52) U.S. Cl. ........................................ 464/146; 464/906
(58) Field of Classification Search ...................... 464/17, 464/146, 162, 906; 292/308, 310, 322; 138/89; 228/50, 60; 285/288.11
See application file for complete search history.

(56) References Cited

U.S. PATENT DOCUMENTS

| | | | | |
|---|---|---|---|---|
| 2,371,823 | A | * | 3/1945 | Jackson ...................... 228/50 X |
| 3,869,878 | A | * | 3/1975 | Davies et al. .............. 464/146 X |
| 4,652,019 | A | * | 3/1987 | von Ahrens .......... 285/288.11 X |
| 5,582,546 | A | | 12/1996 | Welschof |
| 6,171,196 | B1 | | 1/2001 | Welschof |
| 6,237,920 | B1 | | 5/2001 | Nicolai et al. |
| 6,354,604 | B1 | | 3/2002 | Nicolai |
| 7,226,360 | B2 | * | 6/2007 | Lyon et al. ..................... 464/146 |
| 2007/0191121 | A1 | | 8/2007 | Zierz et al. |
| 2008/0153607 | A1 | * | 6/2008 | Frost et al. ..................... 464/162 |

FOREIGN PATENT DOCUMENTS

| | | |
|---|---|---|
| DE | 24 19 236 | 5/1975 |
| DE | 43 44 177 | 2/1995 |
| DE | 196 52 100 | 4/1998 |
| DE | 197 36 546 | 3/1999 |
| DE | 198 57 460 | 6/2000 |
| DE | 101 20 884 | 11/2002 |
| DE | 10 2006 006 441 | 8/2007 |
| FR | 2 824 122 | 10/2002 |

* cited by examiner

*Primary Examiner* — Gregory Binda
(74) *Attorney, Agent, or Firm* — Collard & Roe, P.C.

(57) ABSTRACT

A sealing assembly includes a sealing element and its placement in homokinetic joints. This sealing element seals the outer joint part relative to a pipe or a hollow shaft. The sealing element is connected with the outer joint part which is connected with a sealing rolled bellows on the opposite side. In this case, the sealing element is configured as a closure lid provided with a pressed projection, and a set back piece on its outer circumference. This lid includes a cylindrical or turned over shape, and is disposed on the outer joint part of the homokinetic joint by way of the pressed projection and by secondary weld seams of a friction weld or magnetic arc weld that connects the outer joint part with a pipe. This connection is with a shape fit or a force fit whereby the closure lid in the set back partial piece is configured with a circumferential groove as well as with planned breakage points.

6 Claims, 3 Drawing Sheets

SEALING ELEMENT AND SEALING ASSEMBLY FOR HOMOKINETIC JOINTS

CROSS REFERENCE TO RELATED APPLICATIONS

This application hereby claims priority from German Patent Application Serial No. 10 2008 015 006.1 filed on Mar. 19, 2008, the disclosure of which is hereby incorporated herein by reference in its entirety.

BACKGROUND OF THE INVENTION

1. Field of the Invention

One embodiment relates to a sealing element comprising a closure lid for sealing off the outer part of a homokinetic joint, relative to a pipe or a shaft. The sealing element is connected to the outer part, as well as to a sealing assembly having such a sealing element.

The homokinetic joints are configured with an inner hub and an outer hub and which have multiple raceways, and which are assigned to one another in pairs. These raceways receive raceway balls guided in a cage and are accommodated to transfer torque between the inner hub and the outer hub, and sealing toward the outside. These homokinetic joints can be used in longitudinal or side shafts of motor vehicles. These are provided with a lubricant that ensures good behavior of the homokinetic joints with regard to friction or wear.

To prevent lubricant from exiting from the joint, and to prevent penetration of dirt particles or similar foreign bodies, these joints are sealed.

This sealing is done by way of elastomer parts, caps and closure lids wherein the outer joint parts are sealed, relative to the shaft journal, using folded or rolled bellows, and sealed with sheet-metal lids at their outer flange surfaces.

The elastic sealing elements are positioned between the metallic surfaces to achieve sealing. These metallic surfaces lay one on top of the other, since the metallic surfaces cannot reliably prevent exiting of the lubricant during operation. This is because the surfaces are not machined precisely, but the sealing elements used are subject to wear.

2. The Prior Art

One sealing assembly having a homokinetic rotary joint is known from German Patent DE 198 57 460 C2 also published as U.S. Pat. No. 6,354,604, which comprises an outer joint part having at least one opening on an axial end, an inner joint part inserted into this, having a drive shaft connected with it, and roller bodies that act between the outer joint part and the inner joint part, serving to transfer torque, whereby at least one sheet-metal element having a ring surface rests on a face surface of the outer joint part, and the outer joint part and the sheet-metal element are braced relative to one another, and a first surface—right ring surface or face surface—has a surface structure with elevations and depressions, and the other surface, in each instance—ring surface or face surface—forms a planar counter-surface. In this connection, the plastic-elastic sealing means is introduced between the ring surface and the face surface, and is formed into the interstices of the surface structure in the elevations of the planar counter-surfaces.

A sealing assembly for a homokinetic rotary joint having an inner joint part that is connected with a shaft journal, and having an outer joint part that is sealed, relative to the shaft journal, with a folded bellows, and having a closure lid on the outer joint part, which is braced between the outer joint part and the inner joint part with an edge region, is described in DE 197 36 546 C 2, also published as U.S. Pat. No. 6,237,920 in which the closure lid is connected with the outer joint part by means of an adhesive layer consisting of a sealant, which layer is supposed to act to provide a seal relative to the flange surface and relative to the closure lid.

Sealing of homokinetic joints is one of the prerequisites for operational reliability and for proper functioning of the homokinetic joint, in each instance. Taking these requirements into account, there are different solution proposals. For example, DE 24 19 236 A describes a homokinetic joint that is sealed off, on one side, by means of a cover part, whereby this cover part is connected between a shaft and the outer ring of the homokinetic joint. On the opposite side, sealing of the homokinetic joint takes place by means of a rubber bellows.

A joint assembly having sealing means has become known from DE 10 2006 006 441 A 1, which was also published as U.S. Patent Application Publication No. 2007191121 which is formed from a lid and a membrane part. The lid is disposed on one side, and the membrane part is disposed on the opposite side; they are connected with the outer part of the homokinetic joint and the subsequent components, in each instance.

A homokinetic rotary joint for a longitudinal drive shaft having optimized crash behavior is described in DE 196 52 100 C 1 and which is also published as U.S. Pat. No. 6,171, 196. This homokinetic rotary joint is also sealed off, on the right and left side, with regard to external influences, on the one side by way of a known rolled bellows, and on the other side by way of a lid that is provided in a tubular shaft. This lid is primarily disposed in order to guarantee telescoping or unhindered telescoping of the individual parts in the case of a crash, and it also takes on certain sealing functions in this connection.

A homokinetic joint of this type is described by DE 43 44 177 C 1, which is also published as U.S. Pat. No. 5,582,546, whose geometric dimensions of the individual functional parts are coordinated with one another in such a manner that the inside diameter of the outer joint part or of the subsequent tubular shaft that follows the clear space taken up by the inner joint part during operation, when displacement movements occur, is smaller, in the direction towards the tubular shaft, than the outside diameter of the inner joint part. Thus, undisturbed telescoping of the individual components of the homokinetic joint in the case of a crash is supposed to be made possible. Sealing of the homokinetic joint in the direction of the tubular shaft takes place by way of a lid disposed in the tubular shaft, and on the opposite side by way of a rolled bellows that is provided.

One solution that relates to a sealing element and a sealing assembly on a homokinetic rotary joint has become known from DE 101 20 884 A 1, which is also published as FR 2 824 122. The sealing element consists of a ring disk having face surfaces on both sides. In the ring disk is provided at least one circumferential groove, and in the groove of the sealing element is inserted and permanently attached a sealing ring made of permanently elastic sealing mass. The sealing element is arranged between the cover and the outer port of the homokinetic rotary joint.

It is a disadvantage of these solutions that additional sealing elements/sealing materials are used to attach the sheet-metal lid and to seal the homokinetic joint, in order to achieve a good seal of the homokinetic joint. The disadvantage is particularly due to the fact that elastic sealing elements and adhesives that are used harden and become porous after a certain period of time, so that it cannot be prevented that lubricant exits to the outside from the interior of the homokinetic joint, and in return, undesirable foreign particles can get into the interior of the homokinetic joint.

It is furthermore disadvantageous that when welding a pipe or a shaft to the outer part of the homokinetic joint, elevated temperatures occur, which also have a negative effect on the sealing properties of the adhesive or sealing elements that are used.

SUMMARY OF THE INVENTION

Proceeding from this, one embodiment of the present invention comprises a sealing element and a sealing assembly which seals homokinetic joints in a cost advantageous manner.

Thus the solution according to at least one embodiment comprises a sealing element that is configured as a closure lid that has a turned over shape, that has an outer diameter that is configured in a stepped shape.

This stepped-shape configuration of the outer diameter/circumference of the closure lid is formed by means of a pressed projection and a set-back partial piece. The outer diameter/circumference of the closure lid is formed with two different diameters. In this case, the pressed projection is configured with the greater diameter, and the set-back partial piece is configured with smaller diameter.

One embodiment of the invention comprises a sealing assembly having a sealing element configured as a closure lid, which is pressed into the outer joint part by way of the pressed projection, and thereby connected with it with both shape fit and force fit.

The force fit and thus also the firm connection between the sealing element and the outer joint part is additionally achieved. Thus, there is increased strength of the connection between the closure lid and the outer joint part.

Therefore, the welding process results in the connection of the homokinetic joint with a pipe or a shaft to be welded onto the outer joint part, thereby causing an increase in the strength of the force-fit connection of the outer joint part with the closure lid.

The longitudinal shafts and the joints that are used are configured to telescope relative to one another. This telescoping of the parts can be useful in the event of a crash. To prevent greater destruction of the motor vehicle and thus to prevent injuries to parties in the motor vehicles, the closure lid of the sealing element is configured to be a breakage point.

These planned breakage points are disposed in the transition region from the outer diameter to the turned-over shape of the closure lid.

In this embodiment of the closure lid, there is also a pressed projection and a set-back partial piece on its outer circumference. The closure lid also has a circumferential groove on the outer circumference of the set back partial piece.

The connection of the homokinetic joint to another piece such as a hollow shaft occurs by a weld connection of the pipe or shaft that lies against the outer joint part of the homokinetic joint, on its face side. The contact surfaces form the weld surface, and friction welding or magnetic arc welding are used as the welding methods. In this case, the selection and determination of the weld surface, and the connection point of the pipe/hollow shaft to the outer joint part of the homokinetic joint takes place using the geometrical dimensions of these parts. This design is also adapted to take into consideration the configuration and insertion of the closure lid into the outer joint part. Thus, the weld location is situated in a region of the set-back partial piece of the closure lid, therefore between the outer circumference of the set-back partial piece and the inside diameter of the outer joint part, thus forming an air gap.

During friction welding, the outer joint part and the pipe to be welded on, such as the hollow shaft to be welded on, are connected at their common weld surface, and at the same time, secondary weld seams occur. These secondary weld seams can be in the form of weld beads that form at an outer circumference of the outer joint part and pipe/hollow shaft, as well as at the air gap between the outer joint part/pipe/hollow shaft, and at the set-back part of the closure lid, therefore, there is an additional connection and attachment of the closure lid with the outer joint part of the homokinetic joint, and thus, there are secondary weld seams formed.

When there is a closure lid that has a circumferential groove formed in the set-back partial piece, this groove is situated directly below the weld seam surface of the outer joint part, toward the pipe to be welded on the hollow shaft to be welded on. Therefore, the result is that during the welding process, the lower secondary weld seam can develop beyond the available air gap into the circumferential groove of the closure lid, and thus the lower weld bead rests against the side surfaces of the groove. Thus, there is a shape fit and the strength related connection of the closure lid with the outer joint part is increased. However, taking into consideration the case of a crash, the closure lid is destroyed so that parts of the inner joint part can telescope in the direction of the pipe interior of the welded on pipe/hollow shaft.

Another advantage of this solution is that due to the configuration of the sealing element, and its placement on the outer joint part of a homokinetic joint, the joint is sealed toward the outside, without lubricants situated in the interior of the homokinetic joint being able to exit from it. Thus, a weld technology is guaranteed by way of the weld between the outer joint part and the pipe to be connected or the hollow shaft to be connected. In this case, the weld between the outer joint part and the sealing element are configured as a closure lid that is inserted into the outer joint part.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
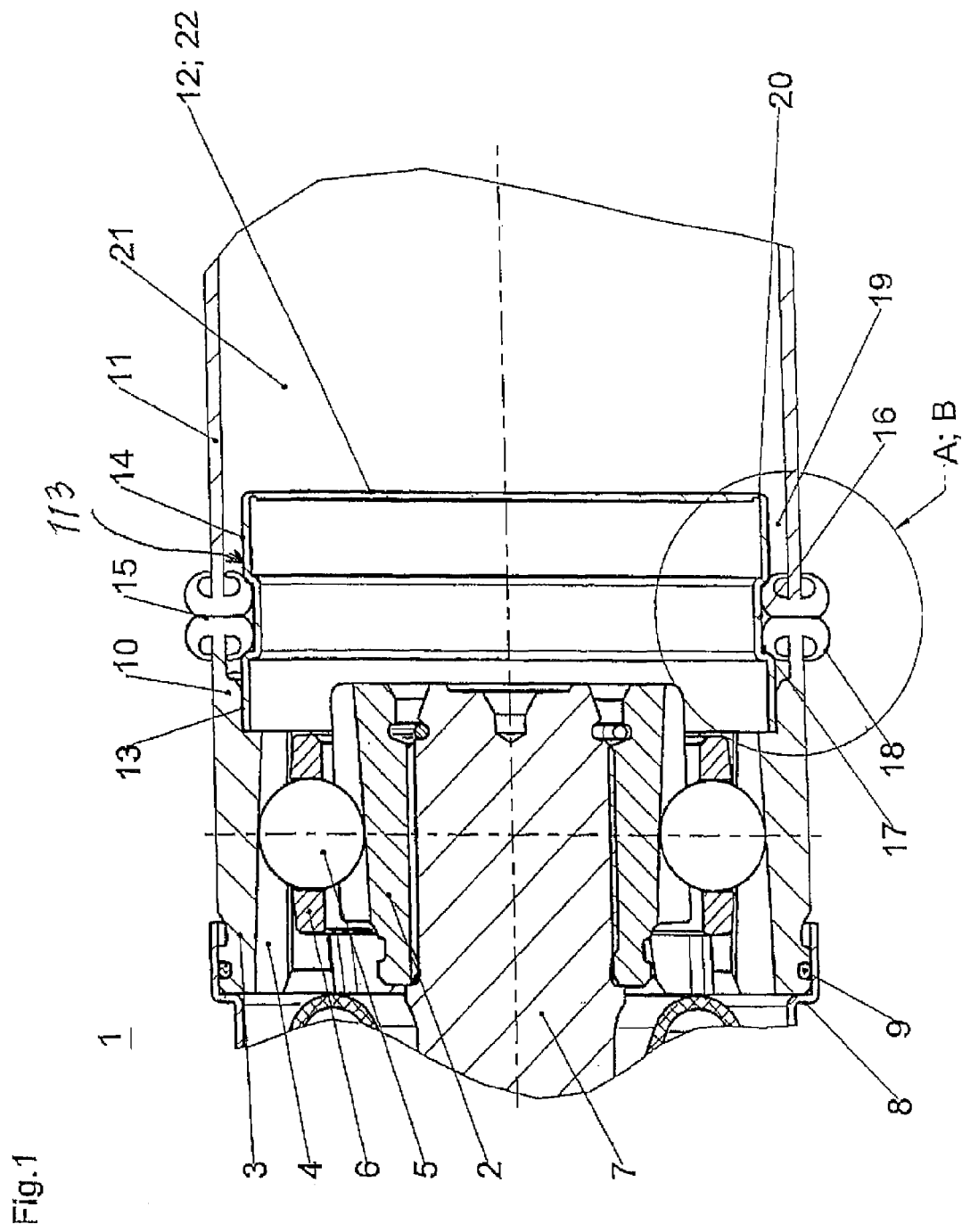
FIG. 1 is a sectional representation of a homokinetic joint having an assigned rolled bellows and a sealing element provided on the opposite side of the homokinetic joint wherein this sealing element is configured as a closure lid.

Referring to the drawings, FIG. 1 shows a homokinetic joint 1 that is formed from an inner joint part 2 and an outer joint part 3, which has raceways 4. Balls 5, are disposed in raceways 4 and these balls transfer torque by means of homokinetic joint 1. Essentially, these balls are disposed in raceways 4, guided in a cage 6.

Homokinetic joint 1 is connected with a drive train, not shown in any detail, by way of a shaft journal 7 disposed in inner joint part 2.

Sealing of the homokinetic joint 1 on the left side occurs by way of a rolled bellows 8, which is connected with outer joint part 3, and with shaft journal 7.

A rubber ring 9 provided between the rolled bellows 8 and the outer joint part 3, for example an O-ring, has an additional sealing effect.

On the right side, homokinetic joint 1 is sealed, relative to the pipe interior 21 of a pipe 11 and is connected with outer joint part 3, by means of a closure lid 12; 22, which is configured in a cylindrical embodiment, whereby this can also possess a turned-over or folded over shape.

The configuration of closure lid 12; 22 and its sealing assemblies relative to outer joint part 3 of homokinetic joint 1 are shown in an enlarged representation in the details A; B according to FIGS. 2 and 3.

Figure 2:
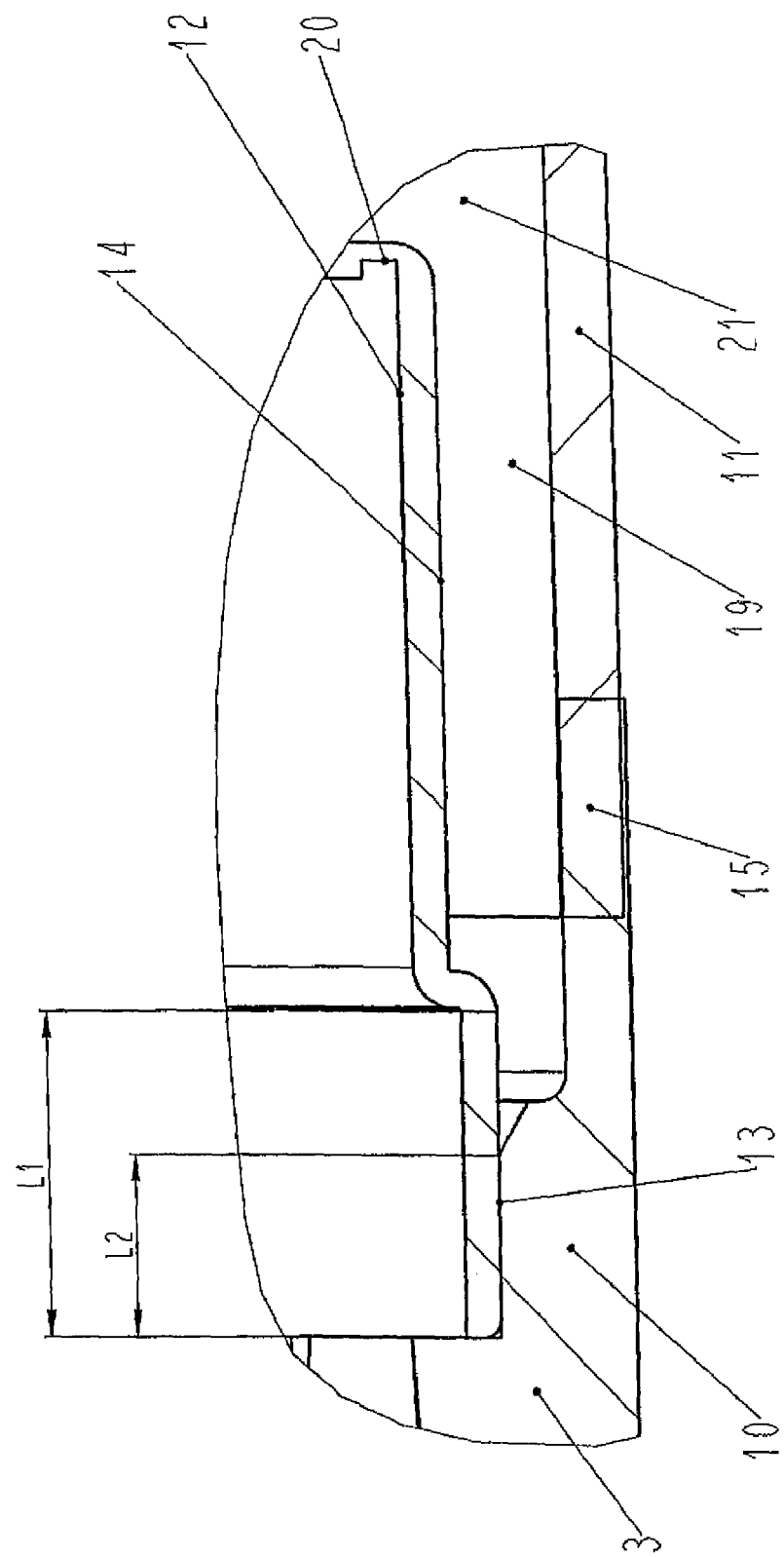
FIG. 2 is a detail A according to FIG. 1.
Figure 3:
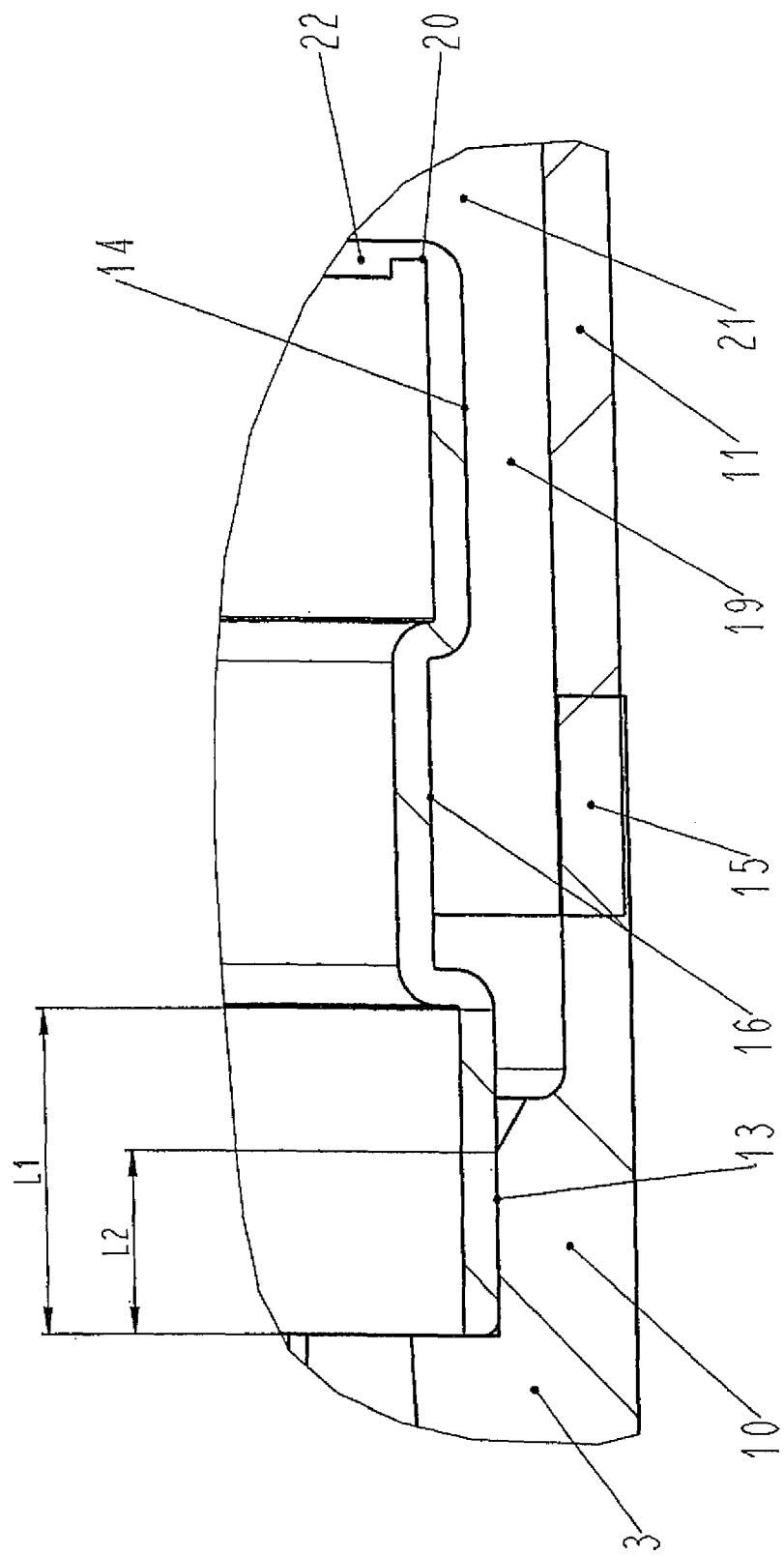
FIG. 3 is another embodiment of a closure lid as a Detail B according to FIG. 1.

Thus, FIG. 2 shows that closure lid 12 is configured with a pressed projection 13 and a set-back partial piece 14 in its outer circumferential region. Closure lid 12 is tied into accommodation 10 (See FIG. 1) of outer joint part 3, with shape fit and force fit, by way of pressed projection 13. In addition, an air gap 19 is present between set-back partial piece 14 of closure lid 12 and accommodation 10.

As is also shown in FIGS. 1 and 2, pressed projection 13 is configured with a smaller length dimension L2 as compared with the length L1 of accommodation 10 of outer joint part 3.

Connection of pipe 11 or also connection of a hollow shaft to the outer joint part 3 takes place by means of a welding process, shown as welding location 15. Air gap 19 between accommodation 10 of outer joint part 3 and set-back partial piece 14 of closure lid 12 guarantees that the weld seam can form without hindrance by using weld beads 17; 18 that form at weld location 15.

For welding, friction welding or magnetic-arc welding can be, or is used, as the welding method. This welding type can be integrated well into the production sequence, in terms of process technology. This welding method guarantees a strong connection between the parts to be welded. In this case, precise sealing of outer joint part 3 relative to pipe interior 21 is provided by the sealing assembly that is created. In this case, the shape-fit and force-fit connection between closure lid 12 and outer joint part 3 is assured by way of the weld seam of weld location 15.

As is described above, in another embodiment of the invention, the sealing assembly and sealing configuration for sealing outer joint part 3 relative to pipe interior 21 are implemented by way of a closure lid 22, which is also configured with a pressed projection 13 and a set-back partial piece 14. In addition, in this embodiment, a circumferential groove 16 is provided in set-back partial piece 14 of lid 22. Set-back partial piece 14 has a diameter up to 10 mm, and is smaller in diameter as compared with an outside diameter of pressed projection 13.

Closure lid 22 has a circumferential groove 16 having side surfaces, as shown in FIG. 1. Weld beads 17, 18 are formed in circumferential groove 16 and are delimited on the side by the side surfaces of circumferential groove 16.

Furthermore, in this closure lid 22, a planned breakage point 20 is also configured in the outer region, which guarantees that in the case of a crash, homokinetic joint 1 can telescope. This means that when an overly great axial force on homokinetic joint 1 occurs, the planned breakage point 20 is "activated," i.e. closure lid 22 is destroyed in this region, and thus it is possible to achieve telescoping of the individual functional elements of homokinetic joint 1 into pipe interior 21.

Closure lid 12 can also be configured with a planned breakage point 20, if this is necessary or advantageous, taking the prevailing conditions into account.

The configurations of pressed projection 13 and of set-back partial piece 14 of closure lid 22 correspond, in terms of their shape and dimensions, to those of closure lid 12. Circumferential groove 16 is disposed in closure lid 22, and is provided in set-back partial piece 14 so that it is situated below weld location 15. Connecting pipe 11 with outer joint part 3 by means of welding technology occurs at weld location 15, also by means of friction welding or magnetic-arc welding. As a result of circumferential groove 16 provided below weld location 15, it is guaranteed that inner weld bead 17 can form in groove 16, and thus an additional shape-fit locking effect and attachment of closure lid 22 relative to outer joint part 3 is provided by way of weld bead 17.

A shape-fit and force-fit connection is formed between closure lid 22 and the outer joint part 3, with the exclusion of additional sealing elements. This connection forms both a functionally reliable strong connection and a sealing connection.

Therefore, in at least one embodiment, there is a sealing assembly for homokinetic joints which couples an outer joint part 3 of the homokinetic joint with a pipe 11. In this embodiment, the sealing assembly comprises a sealing element body 113, wherein the sealing element body 113 is formed by at least the pressed projection 13 and the set back partial piece 14. In this case, the set back partial piece 14 is disposed on an outer circumference of the sealing element body and is formed in a substantially cylindrical shape. The pressed projection 13 is formed on the sealing element body 113. In addition, there is a weld seam that connects the outer joint part 3 with the pipe 11 with shape and force fit. In this case, there is a closure lid 22 formed on the set-back partial piece and which has at least one breakage point 20 which can be in the form of a telescoping means for allowing the sealing element body/homokinetic joint to telescope in, in the event of damage to the homokinetic joint, such as in the event of an automobile accident. As described above, the breakage point allows for telescoping of the elements of the homokinetic joint in the event of an accident.

Accordingly, while only a few embodiments of the present invention have been shown and described, it is obvious that many changes and modifications may be made thereunto without departing from the spirit and scope of the invention.

What is claimed is:

1. A sealing arrangement for homokinetic joints, comprising:
   an outer homokinetic joint part connected with a pipe via a weld; and
   a closure lid configured with a press shoulder and a set-back partial piece on its outer circumference, said set-back partial piece having a circumferential groove and being configured with planned breakage points.

2. The sealing arrangement according to claim 1, wherein the weld forms a weld seam with a plurality of weld beads disposed above and below the weld seam in a region of the weld seam.

3. The sealing element according to claim 2, wherein at least one of said weld beads is located in said circumferential groove, and is delimited on the circumference by the side surfaces of said circumferential groove.

4. The sealing element according to claim 1, wherein the circumferential groove has side surfaces along a circumference of said groove.

5. The sealing element according to claim 1, wherein the set-back partial piece has a diameter that is smaller than an outside diameter of the press shoulder.

6. The sealing element according to claim 1, wherein the closure lid forms a shape-fit and force-fit connection with the outer joint part and seals the outer joint part, with the exclusion of additional sealing elements.

* * * * *